UNITED STATES PATENT OFFICE.

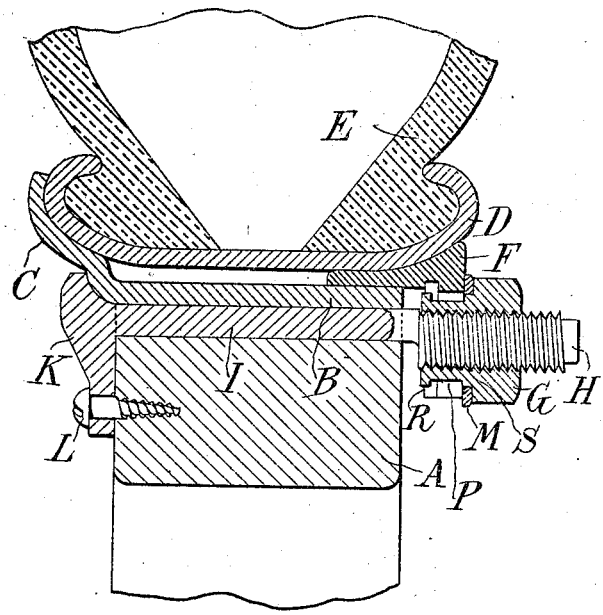
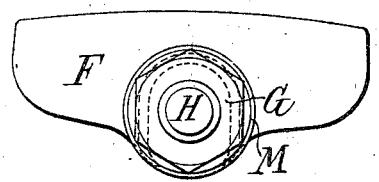
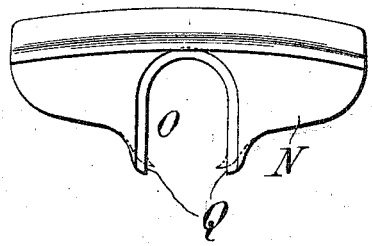
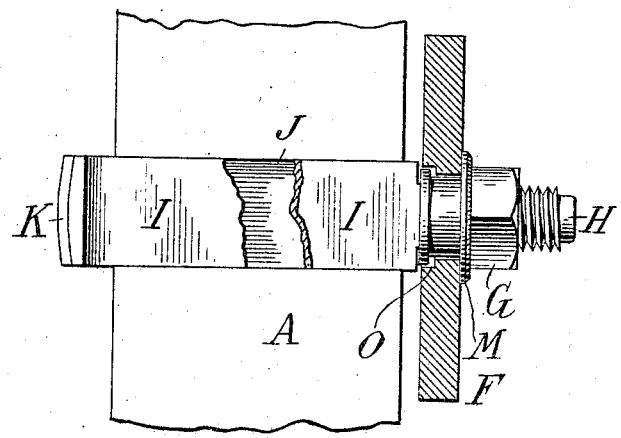

HENRY P. KRAFT, OF RIDGEWOOD, AND MAXIMILIAN CHARLES SCHWEINERT, OF WEST HOBOKEN, NEW JERSEY.

DETACHABLE WHEEL-RIM.

1,163,670.  Specification of Letters Patent.  Patented Dec. 14, 1915.

Application filed August 10, 1910. Serial No. 576,581.

*To all whom it may concern:*

Be it known that we, HENRY P. KRAFT, residing in Ridgewood, in the county of Bergen and State of New Jersey, and MAXI-MILIAN CHARLES SCHWEINERT, residing in West Hoboken, county of Hudson, and State of New Jersey, both citizens of the United States, have invented certain new and useful Improvements in Detachable Wheel-Rims, of which the following is a specification.

This invention relates to demountable rims for pneumatic tires, and aims to provide certain improvements therein.

It has heretofore been proposed to mount a pneumatic tire upon a rim which is adapted to be removably applied to the wheel of an automobile or other vehicle, the object being to permit the carrying of a supplemental inflated tire in order that it may be quickly substituted for an injured tire. In constructions of this type the wheel is provided with a metal rim having a flange at one side thereof which is adapted to receive and support the side of the tire rim, and a series of wedges are introduced between the opposite side of the tire rim and the wheel rim to support the opposite side and to fixedly secure the tire rim in place upon the wheel. Such wedges or other analogous devices are usually forced into place by means of nuts acting upon bolts which for the purpose of securing additional strength and rigidity are passed through the wooden felly of the rim and are provided with a head or other enlargement adapted to engage the flanged side of the wheel rim. In order to provide for a sufficiently strong connection between the nuts and bolts it is important that a certain standard size of bolt shall not be materially departed from. In automobiles of a certain size these standards impose no particular difficulty since the wooden felly of the wheel is of sufficient dimensions and strength to bear the strains of use, notwithstanding the weakening effect of a series of holes of sufficient size to accommodate the bolts. In small cars, however, the wooden fellies are of reduced dimensions, and the comparatively large holes necessary for the bolts are found to weaken the wheel structure. The present invention is designed to avoid these disadvantages, and to provide a bolt of sufficient strength to withstand the strains of use, which bolt has a screw-threaded part of ample size for convenience and safety in use, while at the same time the felly of the wheel is weakened to as small a degree as possible.

The invention includes other features of improvement which will be hereinafter pointed out.

Referring to the drawings, Figure 1 is a section of the preferred form of the invention. Fig. 2 is a view looking down on Fig. 1 with the several rims removed. Fig. 3 is an outer side view of one of the wedges. Fig. 4 is an inner side view of Fig. 3.

Referring to the drawings let A indicate the wooden felly of an automobile or other wheel which is provided with a metal rim B. The rim B is formed on its inner side with a flange C so shaped as to support one side of the tire rim D. The rim D may be of any suitable construction, but is shown as being provided with side channels designed to receive the enlarged edges of the outer shoe E of a pneumatic tire. The tire may be held in position upon the rim D by the usual lugs or in any other manner, this forming no part of the present invention. On the side of the felly A opposite the flange C are usually provided a series of wedges F which are forced in between the rim D and the rim B by nuts G, screwing upon the threaded ends H of bolts I. It is found in practice that the threaded ends of the bolts used in this connection must practically be of a certain diameter in order that they may be provided with threads of the proper pitch, and that they may have sufficient strength to resist the strains of use. If the felly A in the smaller types of cars were provided with holes of sufficient diameter to accommodate a bolt of the same diameter as the threaded end H, it would be unduly weakened, in many cases beyond the point of safety. According to our invention we retain the proper diameter of the threaded end H, but we flatten the body of the bolt to such a degree that it is necessary to cut away the felly in a radial direction to a comparatively slight extent in order to provide a passage for the bolt. Preferably the felly is recessed at intervals on its outer side as shown at J, the recesses conforming to the shape of the body of the bolt.

In the rim shown the bolt is provided on its inner end with a head K which extends outwardly, and engages a portion of the flange C of the wheel rim B. The head K may also be connected with the wooden felly by a screw L in order to prevent displacement of the bolt, although with the construction provided by the invention the screws L may be omitted. In the construction shown in the drawing the bolt lies with its outer side directly under and in contact with the rim B, which is a desirable feature since the engagement of the head K with the rim is thereby facilitated.

The screw-threaded end H of the bolt is preferably displaced with relation to the body portion I, as shown in Fig. 1 so that its upper side lies in the same general plane as the upper face of the body portion, while the lower side of the screw-threaded end lies considerably below the under face of the body portion. This construction provides ample room for the wedges F without reducing their proper proportions.

In assembling the wheel provided with our invention as illustrated herein the bolts are placed in position and the wheel rim B is shrunk over the felly, thus holding the bolts in place. The shrinking operation is facilitated by the fact that the upper side of the screw-threaded portion H lies flush or substantially so with the top of the bolt body.

The invention also provides an improved construction of nut G which is provided with a washer M adapted to act as a locking washer when the nut is tightened. In the construction of fastening device heretofore employed the wedge F is provided with a vertical portion or flange N which is formed with a recess O designed to receive a reduced neck P of the nut. When the nut is adjusted in place the points or edges Q of the flange N are swaged down so that the nut cannot escape. The inner shoulder R of the nut hence limits the movement of the latter in one direction while the head of the nut limits it in the opposite direction. We are enabled to provide a locking washer M in this construction by increasing its internal diameter until it is capable of passing over the shoulder R before the nut and wedge are assembled. A shoulder S is preferably formed on the nut, such shoulder being of approximately the same diameter as the shoulder R, so that the washer is held in a substantially concentric position. The degree of play between the inner edge of the shoulder R and the inner side of the flange N is not sufficient to permit the washer from escaping from its supporting shoulder S. Preferably the washer extends beyond the shoulder to a slight degree in order that the shoulder may not engage the face of the flange N when the nut is tightened.

While we have shown in detail one embodiment of our invention, it will be understood that we do not wish to be limited thereto as various modifications may be made therein without departing from the invention.

What we claim is:—

1. In bolts for demountable rims or the like, the combination of a nut having a reduced portion or neck intermediate of its ends, a shoulder upon said neck of greater diameter than said neck, and a washer seating on said shoulder.

2. In bolts for demountable rims or the like, the combination of a nut having a rounded reduced portion or neck, a shoulder at the inner and outer ends of said neck, each of said shoulders being greater in diameter than said neck, and the inner shoulder being of a diameter not less than that of the outer shoulder, and a washer having an internal diameter slightly exceeding that of said outer shoulder and adapted to slip over the same and seat upon said inner shoulder.

3. In bolts for demountable rims or the like, the combination of a nut having a reduced portion or neck intermediate of its ends, a shoulder upon said neck of greater diameter than said neck, a washer seating on said shoulder and a wedge engaging said neck, said washer bearing against said wedge.

4. In clamping devices for demountable rims, a bolt, a nut having a rounded reduced portion or neck, a wedge engaging said neck, said neck having a shoulder at its outer end to confine said wedge in place on said neck, and another shoulder at its inner end, each of said shoulders being greater in diameter than said neck, and the inner shoulder being of a diameter not less than that of the outer shoulder, and a washer having an internal diameter slightly exceeding that of said inner shoulder, adapted to slip over said outer shoulder and seat upon said inner shoulder between said nut and wedge.

5. In clamping devices for demountable rims, a bolt, a nut having a rounded reduced portion or neck, a wedge engaging said neck and inseparably connected thereto, said neck having a shoulder at its outer end to confine said wedge in place on said neck, and another shoulder at its inner end, each of said shoulders being greater in diameter than said neck, and the inner shoulder being of a diameter not less than that of the outer shoulder, and a washer having an internal diameter slightly exceeding that of said inner shoulder, adapted to slip over said outer shoulder and seat upon said inner shoulder between said nut and wedge.

6. In a clamping device for a demountable rim, a bolt, a wedge, a nut having a neck P, a shoulder R, said wedge inseparably engaging said neck, said nut having a shoulder S at one end of said neck, and a washer M mounted upon said shoulder and adapted to be pressed against the side of said wedge by said nut.

In witness whereof, we have hereunto signed our names in the presence of two subscribing witnesses.

HENRY P. KRAFT.
  MAXIMILIAN CHARLES SCHWEINERT.

Witnesses:
 J. F. WALLACE,
 FRED WHITE.